United States Patent Office 3,379,747
Patented Apr. 23, 1968

3,379,747
METHOD OF MANUFACTURING
ORGANOTIN HYDRIDES
Kazuo Itoi, Kurashiki, Japan, assignor to Kurashiki Rayon Company Limited, Kurashiki, Japan, a corporation of Japan
No Drawing. Filed Aug. 27, 1963, Ser. No. 304,980
Claims priority, application Japan, Sept. 5, 1962, 37/37,469
14 Claims. (Cl. 260—429.7)

The present invention relates to a method of manufacturing tin hydrides, and more particularly, to a method of manufacturing organic tin hydrides which are present in a relatively stable state.

According to the method of the invention, an organotin hydride having the formula $$R_mSnH_{4-m}$$

wherein $m$ is an integer of 1, 2 or 3 and R is an alkyl, cycloalkyl or aryl radical of up to 8 carbon atoms is obtained by reacting an organization compound containing at least one Sn—O bond in its molecules with a silicon compound containing at least one Si—H bond. An example of this method may be expressed in the following formula:

$$R_mSn(OR')_{4-m} + X_nSiH_{4-n} \rightarrow R_mSnH_{4-m} + X_nSi(OR')_{4-n}$$

wherein $m$ is an integer from 1 to 3 inclusive, R is an alkyl, cycloalkyl or aryl radical of up to 8 carbon atoms, R' is hydrogen or alkyl, aryl, cycloalkyl, aralkyl or acyl radicals, $n$ is an integer from 0 to 3, X is one or more of halogen, hydrocarbon radical, alkoxy radical, aryloxy radical or acyl radical.

All of the conventional methods of synthesizing organotin hydrides involve treatment of tin-compounds as listed below:

(1) The method in which the organotinsodium compound are caused to react in liquid ammonia with a halide of ammonium.

(2) The method in which the organotin halides are reduced by the use of lithium aluminum hydride.

(3) The method in which the organotin halides are reduced by the use of aluminum amalgam and water.

However, the reactions involved in these methods are accompanied with various difficulties, such as the high cost of chemicals used, the troublesome method of their treatment, and the many productive processes involved, and in spite of these difficulties, the yield of tin hydride is as low as 60-70%.

But, by the use of the method of this invention, the yield of organotin hydride is remarkably improved and made quantitatively determinate, by suitably selecting the components of reaction, and the organotin hydride compound can be obtained merely by having the two components mixed well and distilled, without using a solvent in the reaction system. This simplicity of procedure is one of the great advantages of the method of the invention. Moreover, for the reasons mentioned above, the organotin hydride compound obtained as a high degree of purity, which is another advantage.

The organotin compound containing the Sn—O bond, used in the method of the invention, is available in many types. Especially desirable among them are the compounds having a general formula of $$R_mSn(OR')_{x-m}$$

wherein R' is a hydrogen atom or an alkyl, aryl, cycloalkyl, aralkyl, radical and the compound having a general formula of $$R_mSn(OMeR''_3)_{4-m}$$

wherein Me is a metal such as Si, Ge, Sn, etc., and R" is an alkyl, aryl or cycloalkyl radical.

The silicon compound used in the method of the invention is also available in many various types, but it is necessary to choose from among them one that is easy to handle and is stable, in which the Si—O compound produced by reaction may easily separate from the Sn—H compound.

For example, hydrogen silane compounds, expressed by the general formula $X_mSiH_{4-m}$ and hydrogen siloxane compounds, such as, hydrogen polysiloxane compounds, are useful.

In the above formula, X represents a halogen atom or a hydrocarbon radical, and $n$ is an integer from 0 to 3 inclusive.

The method of this invention will now be explained in detail with reference to several examples, but it should be understood that the invention is by no means limited to these examples.

Example 1

6 g. of trimethyl silane and 24 g. of bis(tri-n-butyltin) oxide were put into a pressure resistant jar of an inside capacity of 50 cc. The jar was tightly sealed, and heated for 4 hours at 100–110° C. The contents were taken out and distilled under reduced pressure. Almost all was distilled in the range of $K_{p12}$ 120–140° C. The distillate was 25 g., while the colorless transparent liquid residue was 2 g. The distillate was examined by the infrared absorption spectrum. It was found to consist chiefly of $$(n\text{-}C_4H_9)_3 \cdot SnH$$

showing also the absorption of

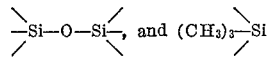

as well as the absorption shifted toward the low frequency side of

considered as the absorption of Si—O in the

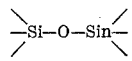

Example 2

If 30 g. of bis(tri-n-butyltin) oxide is added to 6 g. of methyl hydrogen polysiloxane (product of Shin-Etsu Chemical Co., Ltd.), the reaction occurs evolving a large amount of heat. If the mixture is then distilled under reduced pressure, a definite distillate of 28 g. is obtained at $K_{p4}$ 84° C., leaving a residue which is a colorless transparent solid. The infrared absorption spectrum of the distillate is quite identical with the spectrum of pure tri-normal butyl tin hydride.

The yield is 97% in the reaction of

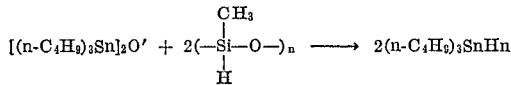

Example 3

A mixture consisting of 10 g. of bis(tri-n-butyltin) oxide and 1 g. of methyl hydrogen polysiloxane was heated to 90° C. under reduced pressure. Distillation occurred at 73–76° C. The temperature of the flask was gradually raised, until it reached 180° C. in 2 hours, but the temperature of distillation remained unchanged. The distillate obtained was 4.5 g. of trinormal butyl tin hydride. The residue was a colorless transparent substance in liquid form.

In view of the above, it is pressumed that the following reaction will take place if a mole ratio of 1:1 is used.

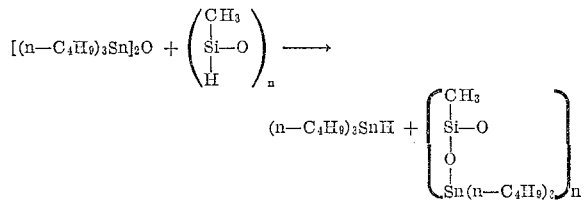

Example 4

If 13 g. of triethyl tin methoxide are added to 9 g. of methyl hydrogen polysiloxane, the two react with each other, emitting heat. When the mixture is distilled at reduced pressure, two distillates are obtained, one at a very low boiling point and the other at around $K_{p22}$ 50° C. The residue in the flask is gelled. The distillates are redistilled, and those in the neighborhood of $K_{p50}$ 60° C. are collected, which amounted to 7 g. It was confirmed through elementary analysis, reaction with titanium tetrachloride, and infrared absorption that the distillate amounting to 7 g., thus obtained was triethyl tin hydride.

Example 5

8 g. of diethyl tin oxide and 20 g. of methyl hydrogen silicon oil were mixed and left for one night, then all gelled. The mixture was distilled under reduced pressure and 2 g. of distillate at 90–92° C. were remained in the container and 4.5 g. were distilled in a trap cooled by Dry Ice-acetone.

The distillate was examined by the infrared spectrum, and it showed that there were existing two absorptions of >Sn–H$_2$ and

in the distillate distilled in the container, while the top distillate distilled in the container, while the top distillate contained in the absorption of 1840 cm.$^{-1}$ and >Sn–H$_2$. It was diethyl tin dihydride having the boiling point of 95–97° C.

Example 6

10 g. of methyl hydrogen polysiloxane were added by drop-by-drop under the cooled condition to 10 g. of diethyl tin dimethoxide, then there evolved violent heat to solidify the product. The product was distilled under reduced pressure, then 6 g. of diethyl tin dihydride were yielded.

What I claim is:

1. A method of manufacturing organotin hydrides having the formula $R_mSnH_{4-m}$ wherein $m$ is an integer from 1 to 3 inclusive and R is a radical having up to 8 carbon atoms selected from the group consisting of alkyl, cycloalkyl and aryl, which comprises reacting an organotin compound selected from the group consisting of (A) compounds having the formula $R_mSn(OR')_{4-m}$ wherein R and $m$ have the above meanings, and R' is selected from the group consisting of hydrogen and alkyl, aryl, cycloalkyl and aralkyl, (B) compounds having the formula $R_mSn(OMeR''_3)_{4-m}$ wherein R and $m$ have the above meanings, and Me is a metal selected from the group consisting of silicon, germanium and tin, R'' is selected from the group consisting of alkyl, aryl and cycloalkyl, and (C) a dialkyl tin oxide having the formula $R_2SnO$ wherein R has the above meaning, with a silicon compound selected from the group consisting of (a) hydrogen silane compounds having the formula $X_nSiH_{4-n}$ wherein X is selected from the group consisting of halogen atoms, hydrocarbon radicals and $n$ is an integer of from 0 to 3 inclusive and (b) hydrogen siloxane compounds, to produce substantialy quantitatively a corresponding organotin hydride, and recovering said organotin hydride.

2. A method claimed in claim 1, wherein the silicon compound is a polysiloxane containing at least one silicon-hydrogen bond in its molecule.

3. A method claimed in claim 1, wherein the organotin compound is dialkyltin oxide and the organotin hydride is dialkyltin dihydride.

4. A method claimed in claim 3, wherein the dialkyltin oxide is diethyltin oxide, and the dialkyltin dihydride is diethyltin dihydride.

5. A method claimed in claim 1, wherein the silicon compound is trialkyl silane.

6. A method claimed in claim 5, wherein the trialkyl silane is trimethyl silane.

7. A method claimed in claim 2, wherein the polysiloxane is methyl hydrogen polysiloxane.

8. A method claimed in claim 2, wherein the polysiloxane is methyl hydrogen silicon oil.

9. A method claimed in claim 1, wherein the organotin compound is trialkyltin monoalkoxide, and the organotin hydride is trialkyltin hydride.

10. A method claimed in claim 9, wherein the trialkyltin monoalkoxide is triethyltin methoxide, and the trialkyltin hydride is triethyltin hydride.

11. A method claimed in claim 1, wherein the organotin compound is dialkyltin dialkoxide, and the organotin hydride is dialkyltin dihydride.

12. A method claimed in claim 11, wherein the dialkyltin dialkoxide is diethyltin dimethoxide, and the dialkyltin dihydride is diethyltin dihydride.

13. A method claimed in claim 1, wherein the organotin compound is bis(trialkyltin) oxide, and the organotin hydride is trialkyltin hydride.

14. A method claimed in claim 13, wherein the bis(trialkyltin) oxide is bis(tri-n-butyltin) oxide, and the trialkyltin hydride is tri-n-butyltin hydride.

References Cited

UNITED STATES PATENTS 3,061,424  10/1962  Nitzsche et al. _____ 260—448.2

TOBIAS E. LEVOW, *Primary Examiner.*

HELEN M. McCARTHY, *Examiner.*

W. F. BELLAMY, *Assistant Examiner.*